(12) United States Patent  
Wilkerson

(10) Patent No.: US 8,738,574 B2
(45) Date of Patent: May 27, 2014

(54) AUTOMATIC WIRELESS DEVICE DATA MAINTENANCE

(75) Inventor: Brian Y. Wilkerson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 515 days.

(21) Appl. No.: 12/972,674

(22) Filed: Dec. 20, 2010

(65) Prior Publication Data

US 2012/0158658 A1 Jun. 21, 2012

(51) Int. Cl.
  *G06F 7/00* (2006.01)
  *G06F 17/00* (2006.01)
  *G06F 17/30* (2006.01)
  *G06F 17/22* (2006.01)

(52) U.S. Cl.
  CPC .... *G06F 17/30011* (2013.01); *G06F 17/30286* (2013.01); *G06F 17/30575* (2013.01); *G06F 17/2288* (2013.01)
  USPC ........................................................ 707/638

(58) Field of Classification Search
  CPC ................... G06F 17/30011; G06F 17/30286; G06F 17/30067; G06F 17/30575; G06F 17/2288
  USPC ........................................................ 707/638
  See application file for complete search history.

(56) References Cited

U.S. PATENT DOCUMENTS

| | | | |
|---|---|---|---|
| 578,054 A * | 3/1897 | Ferris | 401/189 |
| 6,028,537 A | 2/2000 | Suman et al. | |
| 6,278,772 B1 | 8/2001 | Bowater et al. | |
| 6,385,535 B2 | 5/2002 | Ohishi et al. | |
| 6,411,899 B2 | 6/2002 | Dussell et al. | |
| 6,430,488 B1 | 8/2002 | Goldman et al. | |
| 6,459,969 B1 | 10/2002 | Bates et al. | |
| 6,505,780 B1 | 1/2003 | Yassin et al. | |
| 6,600,975 B2 | 7/2003 | Moriguchi et al. | |
| 6,629,033 B2 | 9/2003 | Preston et al. | |

(Continued)

FOREIGN PATENT DOCUMENTS

| | | |
|---|---|---|
| EP | 1969458 | 9/2008 |
| JP | 2007205872 A | 8/2007 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Ajay Bhatia
*Assistant Examiner* — Jessica N Le
(74) *Attorney, Agent, or Firm* — Brooks Kushman P.C.; Jennifer M. Stec

(57) ABSTRACT

A computer-implemented method includes downloading data elements from a wireless device. The method includes determining whether a user account exists in storage and determining whether the user account currently has stored data elements of the same type as the downloaded data elements associated therewith. The method further includes comparing the downloaded data elements to the stored data elements. This method also includes storing any downloaded data elements not currently existing in the data elements associated with the user account and not in conflict with data elements associated with the user account. The method further includes resolving conflicts between downloaded data elements and currently existing data elements, to establish which of the conflicting elements is representative of a proper version of the element. Finally, the method includes storing the proper version of the element resulting from each conflict resolution.

6 Claims, 7 Drawing Sheets

(56) References Cited

U.S. PATENT DOCUMENTS

| | | | |
|---|---|---|---|
| 6,845,251 B2 | 1/2005 | Everhart et al. | |
| 6,928,428 B1 | 8/2005 | De Vries | |
| 6,993,490 B2 | 1/2006 | Chen et al. | |
| 7,065,533 B2 | 6/2006 | Arrouye et al. | |
| 7,120,928 B2 | 10/2006 | Sheth et al. | |
| 7,127,259 B2 | 10/2006 | Ueda et al. | |
| 7,129,825 B2 | 10/2006 | Weber | |
| 7,139,722 B2 | 11/2006 | Perrella et al. | |
| 7,142,664 B2 | 11/2006 | Seligmann | |
| 7,143,058 B2 | 11/2006 | Sugimoto et al. | |
| 7,145,998 B1 | 12/2006 | Holder et al. | |
| 7,162,237 B1 | 1/2007 | Silver et al. | |
| 7,283,813 B2 | 10/2007 | Hamanaga et al. | |
| 7,340,691 B2 | 3/2008 | Bassett et al. | |
| 7,346,630 B2 | 3/2008 | Eichstaedt et al. | |
| 7,376,226 B2 | 5/2008 | Holder et al. | |
| 7,433,714 B2 | 10/2008 | Howard et al. | |
| 7,444,384 B2 | 10/2008 | Horvitz | |
| 7,469,827 B2 | 12/2008 | Katragadda et al. | |
| 7,474,264 B2 | 1/2009 | Bolduc et al. | |
| 7,552,009 B2 | 6/2009 | Nelson | |
| 7,574,195 B2 | 8/2009 | Krasner et al. | |
| 7,586,956 B1 | 9/2009 | Mishra et al. | |
| 7,725,480 B2 | 5/2010 | Bassett et al. | |
| 7,747,246 B2 | 6/2010 | Zellner et al. | |
| 7,801,283 B2 | 9/2010 | Harwood et al. | |
| 7,813,950 B2 | 10/2010 | Perrella et al. | |
| 7,889,096 B2 | 2/2011 | Breed | |
| 7,917,285 B2 | 3/2011 | Rothschild | |
| 7,985,911 B2 | 7/2011 | Oppenheimer | |
| 8,112,720 B2 | 2/2012 | Curtis | |
| 8,126,889 B2 | 2/2012 | Pitt | |
| 8,223,975 B2 | 7/2012 | Marko | |
| 8,233,890 B2 | 7/2012 | Zellner et al. | |
| 8,316,046 B2 | 11/2012 | Huang et al. | |
| 2001/0037174 A1 | 11/2001 | Dickerson | |
| 2002/0068583 A1 | 6/2002 | Murray | |
| 2002/0107032 A1 | 8/2002 | Agness et al. | |
| 2002/0143879 A1* | 10/2002 | Sommerer | 709/206 |
| 2003/0131023 A1 | 7/2003 | Bassett et al. | |
| 2003/0212480 A1 | 11/2003 | Lutter et al. | |
| 2004/0073643 A1 | 4/2004 | Hayes et al. | |
| 2004/0090121 A1 | 5/2004 | Simonds et al. | |
| 2004/0092253 A1 | 5/2004 | Simonds et al. | |
| 2004/0093154 A1 | 5/2004 | Simonds et al. | |
| 2004/0093155 A1 | 5/2004 | Simonds et al. | |
| 2004/0192270 A1 | 9/2004 | Kreitzer | |
| 2004/0220768 A1 | 11/2004 | Klein | |
| 2004/0254715 A1 | 12/2004 | Yamada | |
| 2004/0268270 A1 | 12/2004 | Hill et al. | |
| 2005/0019228 A1 | 1/2005 | Myers et al. | |
| 2005/0088284 A1 | 4/2005 | Zai et al. | |
| 2005/0119030 A1 | 6/2005 | Bauchot et al. | |
| 2005/0149520 A1 | 7/2005 | De Vries | |
| 2005/0222933 A1 | 10/2005 | Wesby | |
| 2006/0058948 A1 | 3/2006 | Blass | |
| 2006/0071804 A1 | 4/2006 | Yoshioka | |
| 2006/0165015 A1 | 7/2006 | Melick et al. | |
| 2006/0168627 A1 | 7/2006 | Zeinstra et al. | |
| 2006/0258377 A1* | 11/2006 | Economos et al. | 455/461 |
| 2006/0290490 A1 | 12/2006 | Kraus et al. | |
| 2007/0004387 A1* | 1/2007 | Gadamsetty et al. | 455/414.1 |
| 2007/0016362 A1* | 1/2007 | Nelson | 701/200 |
| 2007/0042812 A1 | 2/2007 | Basir | |
| 2007/0044037 A1 | 2/2007 | Amari et al. | |
| 2007/0053513 A1 | 3/2007 | Hoffberg | |
| 2007/0061067 A1* | 3/2007 | Zeinstra et al. | 701/200 |
| 2007/0120948 A1 | 5/2007 | Fujioka et al. | |
| 2007/0140187 A1 | 6/2007 | Rokusek et al. | |
| 2007/0233725 A1* | 10/2007 | Michmerhuizen et al. | 707/102 |
| 2007/0238491 A1* | 10/2007 | He | 455/569.2 |
| 2007/0264990 A1 | 11/2007 | Droste et al. | |
| 2007/0281603 A1 | 12/2007 | Nath et al. | |
| 2007/0285256 A1 | 12/2007 | Batra et al. | |
| 2007/0294304 A1 | 12/2007 | Bassett et al. | |
| 2007/0299882 A1* | 12/2007 | Padgett et al. | 707/201 |
| 2008/0005680 A1 | 1/2008 | Greenlee | |
| 2008/0057927 A1 | 3/2008 | Han | |
| 2008/0086455 A1 | 4/2008 | Meisels et al. | |
| 2008/0140488 A1 | 6/2008 | Oral et al. | |
| 2008/0143497 A1 | 6/2008 | Wasson et al. | |
| 2008/0150685 A1 | 6/2008 | Desai et al. | |
| 2008/0159503 A1 | 7/2008 | Helbling et al. | |
| 2008/0263069 A1 | 10/2008 | Harris et al. | |
| 2008/0281518 A1 | 11/2008 | Dozier et al. | |
| 2008/0294483 A1 | 11/2008 | Williams | |
| 2008/0294663 A1 | 11/2008 | Heinley et al. | |
| 2008/0319653 A1 | 12/2008 | Moshfeghi | |
| 2008/0319665 A1 | 12/2008 | Berkobin et al. | |
| 2009/0002145 A1 | 1/2009 | Berry et al. | |
| 2009/0005966 A1 | 1/2009 | McGray et al. | |
| 2009/0011799 A1* | 1/2009 | Douthitt et al. | 455/569.1 |
| 2009/0056525 A1 | 3/2009 | Oppenheimber | |
| 2009/0074168 A1 | 3/2009 | Henry | |
| 2009/0075624 A1 | 3/2009 | Cox et al. | |
| 2009/0094088 A1 | 4/2009 | Chen et al. | |
| 2009/0111422 A1 | 4/2009 | Bremer et al. | |
| 2009/0112608 A1 | 4/2009 | Abu-Hakima et al. | |
| 2009/0144622 A1 | 6/2009 | Evans et al. | |
| 2009/0157615 A1* | 6/2009 | Ross et al. | 707/3 |
| 2009/0157717 A1* | 6/2009 | Palahnuk et al. | 707/101 |
| 2009/0158200 A1 | 6/2009 | Palahnuk et al. | |
| 2009/0193149 A1* | 7/2009 | Khosravy | 709/248 |
| 2009/0248285 A1 | 10/2009 | Bauer | |
| 2009/0267757 A1 | 10/2009 | Nguyen | |
| 2009/0312901 A1 | 12/2009 | Miller et al. | |
| 2010/0017543 A1 | 1/2010 | Preston et al. | |
| 2010/0062714 A1 | 3/2010 | Ozaki | |
| 2010/0125801 A1 | 5/2010 | Shin | |
| 2010/0136944 A1 | 6/2010 | Taylor et al. | |
| 2010/0148920 A1 | 6/2010 | Philmon et al. | |
| 2010/0169432 A1* | 7/2010 | Santori et al. | 709/206 |
| 2010/0210302 A1 | 8/2010 | Santori et al. | |
| 2010/0227629 A1 | 9/2010 | Cook et al. | |
| 2010/0228803 A1 | 9/2010 | Quinn et al. | |
| 2010/0233957 A1 | 9/2010 | Dobosz | |
| 2010/0235891 A1* | 9/2010 | Oglesbee et al. | 726/5 |
| 2010/0274689 A1 | 10/2010 | Hammad et al. | |
| 2010/0274865 A1 | 10/2010 | Frazier et al. | |
| 2010/0287024 A1 | 11/2010 | Ward et al. | |
| 2010/0323657 A1 | 12/2010 | Barnard et al. | |
| 2010/0330975 A1 | 12/2010 | Basir | |
| 2011/0021234 A1 | 1/2011 | Tibbitts et al. | |
| 2011/0039581 A1 | 2/2011 | Cai et al. | |
| 2011/0040707 A1 | 2/2011 | Theisen et al. | |
| 2011/0045810 A1 | 2/2011 | Issa et al. | |
| 2011/0072492 A1 | 3/2011 | Mohler et al. | |
| 2011/0087705 A1* | 4/2011 | Swink et al. | 707/800 |
| 2011/0121991 A1 | 5/2011 | Basir | |
| 2011/0137520 A1 | 6/2011 | Rector et al. | |
| 2011/0137773 A1 | 6/2011 | Davis, III et al. | |
| 2011/0144980 A1 | 6/2011 | Rysenga | |
| 2011/0176670 A1 | 7/2011 | Kaplan et al. | |
| 2011/0257881 A1 | 10/2011 | Chen et al. | |
| 2011/0289522 A1 | 11/2011 | Pontual et al. | |
| 2011/0298924 A1 | 12/2011 | Miller et al. | |
| 2011/0300843 A1 | 12/2011 | Miller et al. | |
| 2011/0300884 A1 | 12/2011 | Ollila et al. | |
| 2012/0010805 A1 | 1/2012 | Wilkerson | |
| 2012/0041633 A1 | 2/2012 | Schunder et al. | |
| 2012/0044089 A1 | 2/2012 | Yarnold et al. | |
| 2012/0050028 A1* | 3/2012 | Mastronardi et al. | 340/441 |
| 2012/0130953 A1* | 5/2012 | Hind et al. | 707/638 |
| 2012/0149441 A1* | 6/2012 | Saito et al. | 455/569.2 |
| 2012/0158658 A1 | 6/2012 | Wilkerson | |
| 2012/0158918 A1* | 6/2012 | Leblanc et al. | 709/219 |
| 2012/0172009 A1 | 7/2012 | Wilkerson | |
| 2012/0202525 A1 | 8/2012 | Pettini | |
| 2012/0225677 A1* | 9/2012 | Forstall et al. | 455/456.6 |
| 2012/0271676 A1 | 10/2012 | Aravamudan et al. | |
| 2012/0272176 A1 | 10/2012 | Nielsen et al. | |
| 2013/0024109 A1 | 1/2013 | Hosotani et al. | |
| 2013/0124085 A1 | 5/2013 | Mochizuki et al. | |

(56) References Cited

U.S. PATENT DOCUMENTS

FOREIGN PATENT DOCUMENTS

| | | | |
|---|---|---|---|
| JP | 2008172820 A | 7/2008 |
| WO | 03107129 A2 | 12/2003 |
| WO | 2011016886 A1 | 2/2011 |

OTHER PUBLICATIONS

Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem", Automotive Design & Production, Oct. 2003, http://findarticles.com, pp. 1-3.
AppManiax, Inc. "PhonePlus Callback". http://www.handango.com/catalog/ProductDetails.jsp?productId=254405&platformId=80), (May 12, 2009).
Christoph Hammerschmidt, MELEX1S, The Sky's The Limit, Continental NXP to integrate NFC into cars, Feb. 17, 2011, http://automotive-eetimes.com/en/continental-nxp-to-integrate-nfc-into-cars.html?cmp_id=.
jNetX Call Reminder for BlackBerry. Feb. 17, 2009. Retrieved from: http://www.pocketberry.com/2009/02/17/jnetx-call-reminder-for-blackberry/.

\* cited by examiner

AUTOMATIC WIRELESS DEVICE DATA MAINTENANCE

BACKGROUND

The illustrative embodiments generally relate to the automatic maintenance of data contained on a wireless device.

Twenty or thirty years ago, people generally had one or two points of contact, a home phone number and maybe a business phone number. Unless a person moved or changed jobs, these numbers were unlikely to change, and the numbers were often recorded by hand in a paper contact phone book or a ROLODEX.

Nowadays, however, the landscape has dramatically changed. With the onset of email, people often have a multitude of "addresses" at which they can be contacted.

Further, the prevalence of cellular phones has added an additional wrinkle. Users may buy new phones, without changing physical addresses, and change numbers. Additionally, since cellular phones store phone numbers, many people have stopped remembering phone numbers of friends and family. Of course, if a cellular phone is lost or ruined, all these stored numbers (and/or email addresses) may be lost.

Cellular phone stores may offer an option to have a list of numbers on an existing phone printed or backed up. But this requires a trip to the store to have this service performed. Even if the backup capability is available on a home-PC, through a wired connection, the user may have to remember to connect the phone and activate the back-up program.

SUMMARY

In a first illustrative embodiment, a computer-implemented method includes downloading a plurality of data elements from a wireless device to a connected vehicle computing system (VCS). The illustrative method further includes determining, via the VCS, whether a user account, corresponding to the wireless device, exists in storage.

Also, the illustrative method includes determining, via the VCS, whether the user account currently has stored data elements of the same type as the downloaded data elements associated therewith. The method further includes comparing, via the VCS, the downloaded data elements to the stored data elements. This comparison may be contingent on whether the user account has stored data elements associated therewith.

This illustrative method also includes storing any downloaded data elements not currently existing in the data elements associated with the user account and not in conflict with data elements associated with the user account.

The method further includes resolving conflicts, via the VCS, between downloaded data elements and currently existing data elements, to establish which of the conflicting elements is representative of a proper version of the element. Finally, the illustrative method includes storing the proper version of the element resulting from each conflict resolution.

In a second Illustrative embodiment, a method for populating a wireless device with data includes connecting to a wireless device from a vehicle computing system (VCS) and determining, via the VCS, if a set of data elements on the wireless device is below a certain size threshold.

The illustrative method additionally includes determining, via the VCS, if a user account corresponds to a user of the wireless device and determining, via the VCS, if the user account has one or more data elements of a certain type for which it was determined that the data elements on the wireless device were below the threshold. Finally, the method includes automatically uploading, from the VCS to the wireless device, the data elements of the certain type.

In a third illustrative embodiment, a computer-implemented method for replacing an invalid data element includes determining, via a vehicle computing system (VCS) that a data element is invalid. The illustrative method further includes accessing one or more social networking sites, through the VCS, associated with a user account corresponding to a wireless device containing the invalid data element.

In this illustrative embodiment, the method also includes, for each social networking site accessed through the VCS, determining whether or not a data type corresponding to the invalid data element is available for a party corresponding to the invalid data element. In this embodiment, the method additionally includes comparing a data element stored on the social networking site under the data type with the invalid data element, if the data type is available.

Also, according to this illustrative method, if the data element stored on the social networking site differs from the invalid data element, the invalid data element stored on at least one of a local storage or the wireless device is replaced with the data element stored on the social networking site.

In a fourth illustrative embodiment, a computer-implemented method for replacing an invalid data element includes determining, via a vehicle computing system (VCS) that a data element is invalid and determining whether an email address is associated with the invalid data element.

This illustrative method also includes, for one or more email addresses associated with invalid data elements, sending a request email to the email address associated with the respective invalid data element. The request email may include a request for an update of the data element.

The illustrative method further includes receiving a response to the request email, the response including a valid response element to the request for an update of the data element. Finally, the illustrative method includes replacing the invalid data element with the valid response element.

DETAILED DESCRIPTION

Although the following describes the invention in terms of illustrative embodiments, these examples are provided for non-limiting illustrative purposes only, and are not intended to limit the scope of the invention thereto.

Figure 1:
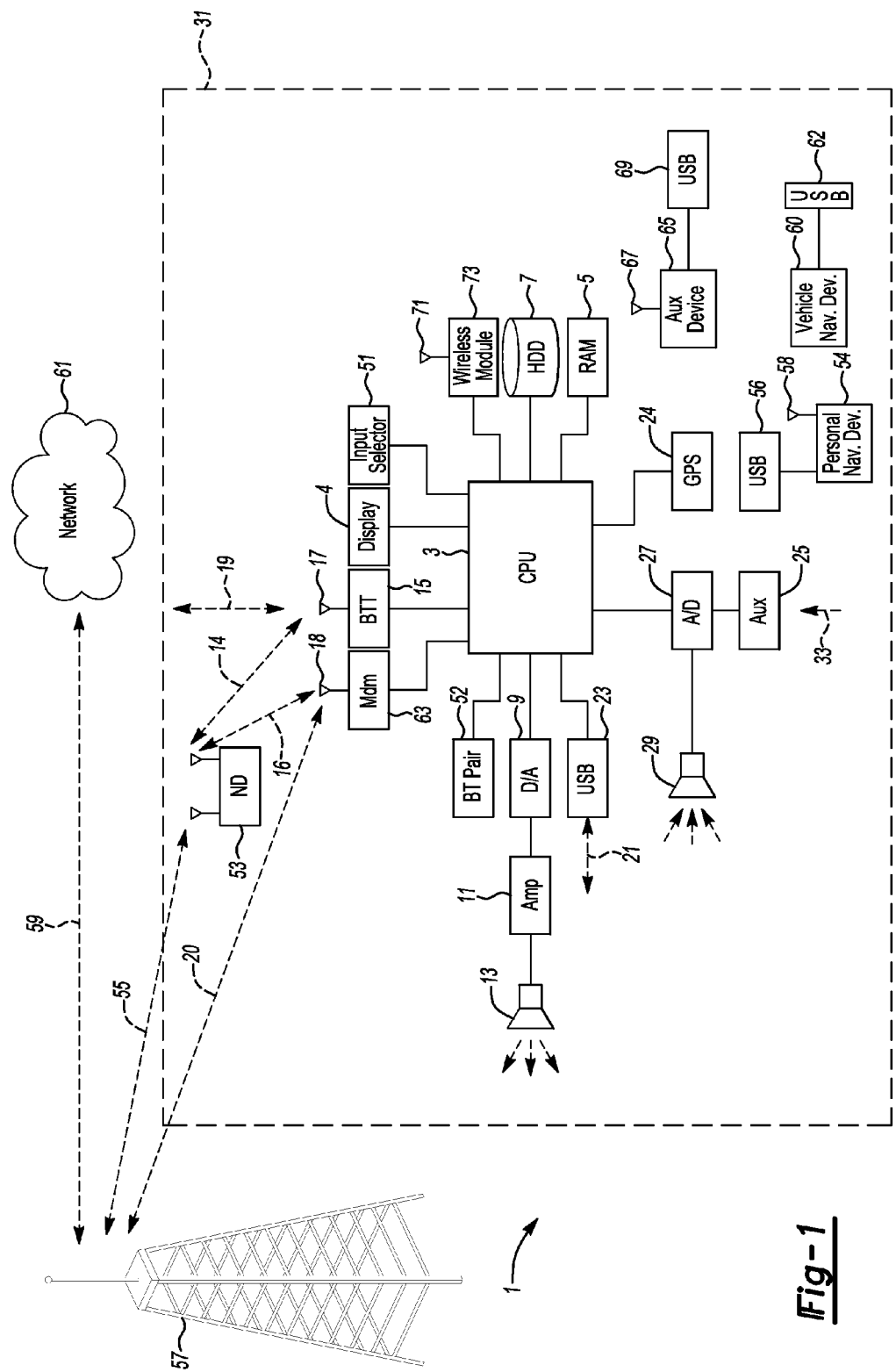
FIG. 1 shows an illustrative example of a vehicle computing system and a remote network.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Using a connection automatically established with a paired wireless device, a vehicle computing system can backup, track, update and even correct wireless device data. In an environment where more than one paired device is present, at least a primary (or higher ranking) device will be managed in any given instance. When only one device is present, unless pairing is disabled, data management will automatically occur for that device, without a need for driver intervention.

Additionally, such a system can utilize Internet based tools to update, delete and correct stored data. It is possible, in such an environment, for a person's entire email list and/or phone list, for example, to be checked in the background while a drive is occurring. Through use of social networking sites, and assuming that information posted on these sites is accurate, a vehicle computing system is capable of automatically actively managing wireless data in the background.

Figure 2:
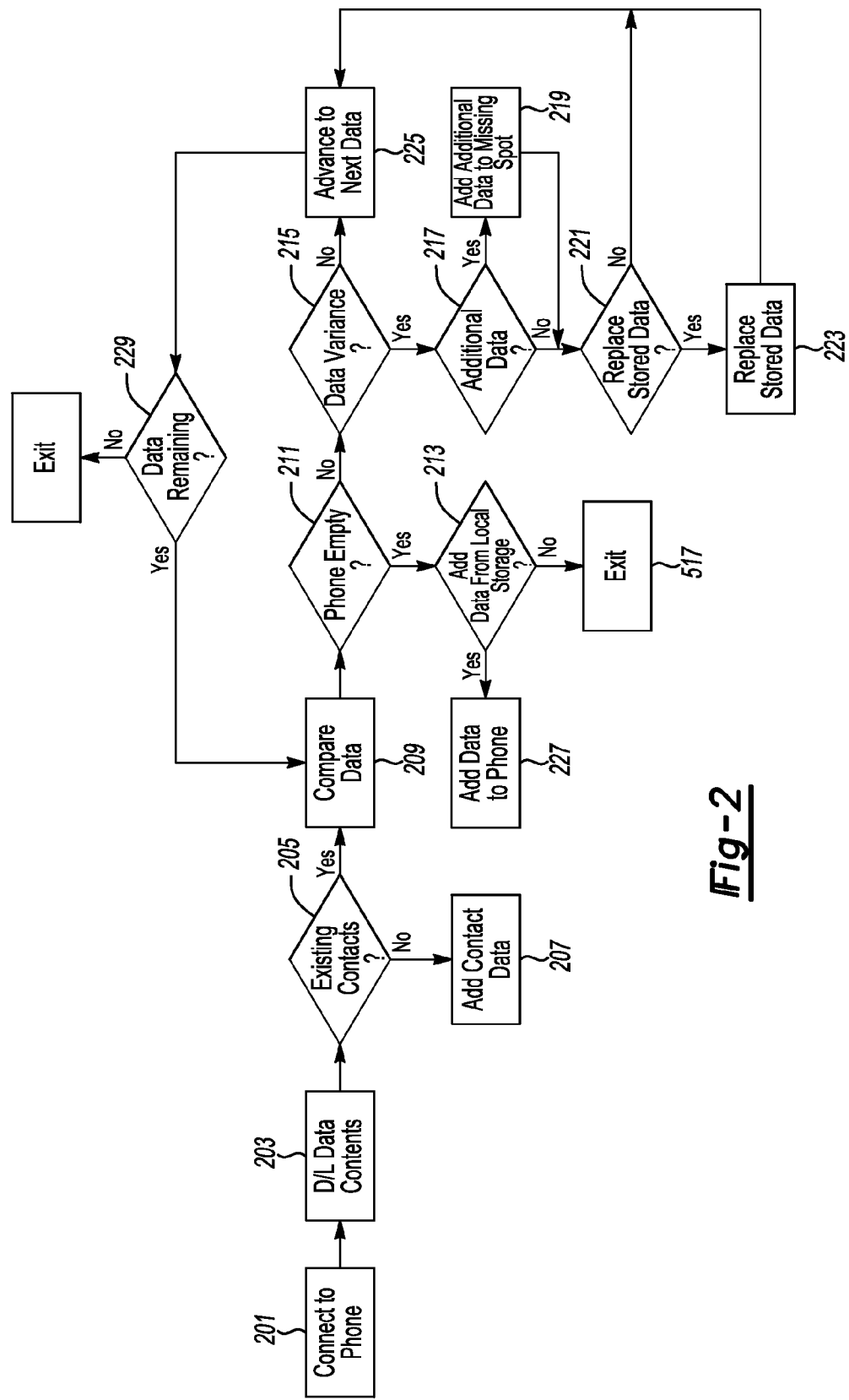
FIG. 2 shows an illustrative example of a process for data storage, maintenance, and recovery.

FIG. 2 shows an illustrative example of a process for data storage, maintenance, and recovery. In this illustrative embodiment, a vehicle computing system first connects to a paired wireless device (or is paired and connected to a device, or connects to a device if no pairing is needed, etc.) 201. Once the connection is established, the vehicle computing system downloads some or all of the data stored on the device 203.

In this illustrative embodiment, examples are given with respect to contact data stored on the device, but the methods described herein could also be used, for example, to update and/or backup programs, pictures, movies, sound, etc.

The computing system then checks to see if data for a user account associated with the wireless device already exists 205. This data could have been previously downloaded from a wireless device (the same device or a different device), uploaded by a user, etc. If there is no data currently associated with the wireless device (either if there is no account, or if the account is empty), the data from the wireless device is added to the account 207. This data may be saved on the vehicle computing system and associated with this account in future situations.

If there is existing data stored on the vehicle computing system already, the data from the wireless device is compared to the existing data. In this illustrative embodiment, the data is compared one contact at a time 209.

If there is no data on the phone to use for comparison 211, i.e., the phone is empty of contacts, then it is likely that the phone is either a new phone or the phone has had its memory erased for some reason. In an instance such as this, the system may ask the user (or automatically decide) if locally stored data associated with that phone or user account should be added to the empty device 213. If the user does not want to add the data, the process exits (since there is no data for comparison and the stored data is not to be added to the phone).

If the user wishes to add the data, the data is transferred from the vehicle computing system storage to the user's wireless device 227. In some instances, a password or PIN may be associated with the account to prevent unwanted access to account data by unauthorized users.

If the wireless device was not empty 211, then the system checks for a variance in the data associated with a particular contact 215. For example, a new phone number could exist, a different phone number could exist, or a new or different email (or other associated data, address, fax number, etc) could exist.

It is also possible that the variance is simply that a particular number stored on the device is simply not present on the local storage, or vice versa. Moving through the data, in a situation such as this, could comprise, for example, moving through vehicle stored data that had no remote correspondence after the remote data had been parsed. Similarly, if the remote (on the device) data is parsed in alphabetical order, gaps in the local storage will be discovered.

If all the data associated with a contact is the same 215, the system advances to the next piece of data 225 and performs the comparison process, unless no data remains to be analyzed 229. As previously noted, since all the data (remote and locally stored) is currently on the temporary or permanent memory of the vehicle computing system, the data advancement may parse both sets of data doing two way comparisons in order to update both memories (the remote memory and the local vehicle computing system memory) with a single pass. It would also be possible, of course, to parse the data remotely on the device and then additionally (if desired) parse local data elements that had not yet been considered (or all the local data).

If there is a variance in the data 215 (for example, without limitation, local data differs from the data obtained from the remote source, or vice versa), the system may first check to see if there is simply additional data 217. In this illustrative embodiment, additional data is distinguished from different data. For example, without limitation, additional data could be an instance of a second phone number associated with the data from the remote device, when a first number associated with the data from the remote device already exists in duplicate in the local storage. Or a new email address (if no email address existed or if a different, duplicated email address existed, etc.).

The additional data is added to the missing location 219 (be it on the local storage or on the remote storage), as a comparison may be made bi-directionally based on data. If data is to be added to the remote storage device (wireless device), a driver may be asked in advance, since there is a possibility that the driver intentionally deleted the data, and does not want it re-added if the last local store included the now-deleted data.

Next, the data variance is checked to see if different data is present. In this example, different data is an instance of one number being stored in one location, and a second, different number being stored in the other location. That is, for example, without limitation, only a single number is stored in each location, but those numbers are difference. Although not necessarily required, in this illustrative example, preference is given to the data taken from the wireless device in the event of a discrepancy, since it is assumed that this data is more likely to be the up to date data. In other words, if a different number is stored locally and remotely, the remote number is used to replace the local number 223, instead of the other way around.

Once all the data has been parsed and considered, the process exits 229. Once the process has exited, there may be a robust, complete, and up to date copy of the remote data stored locally, and any missing gaps in the remote data may have been filled in by stored local data. Also, it is possible that the system queries a user before replacing data in either storage location, so as not to overwrite desired data, or re-write or duplicate data that is no longer desired.

Figure 3:
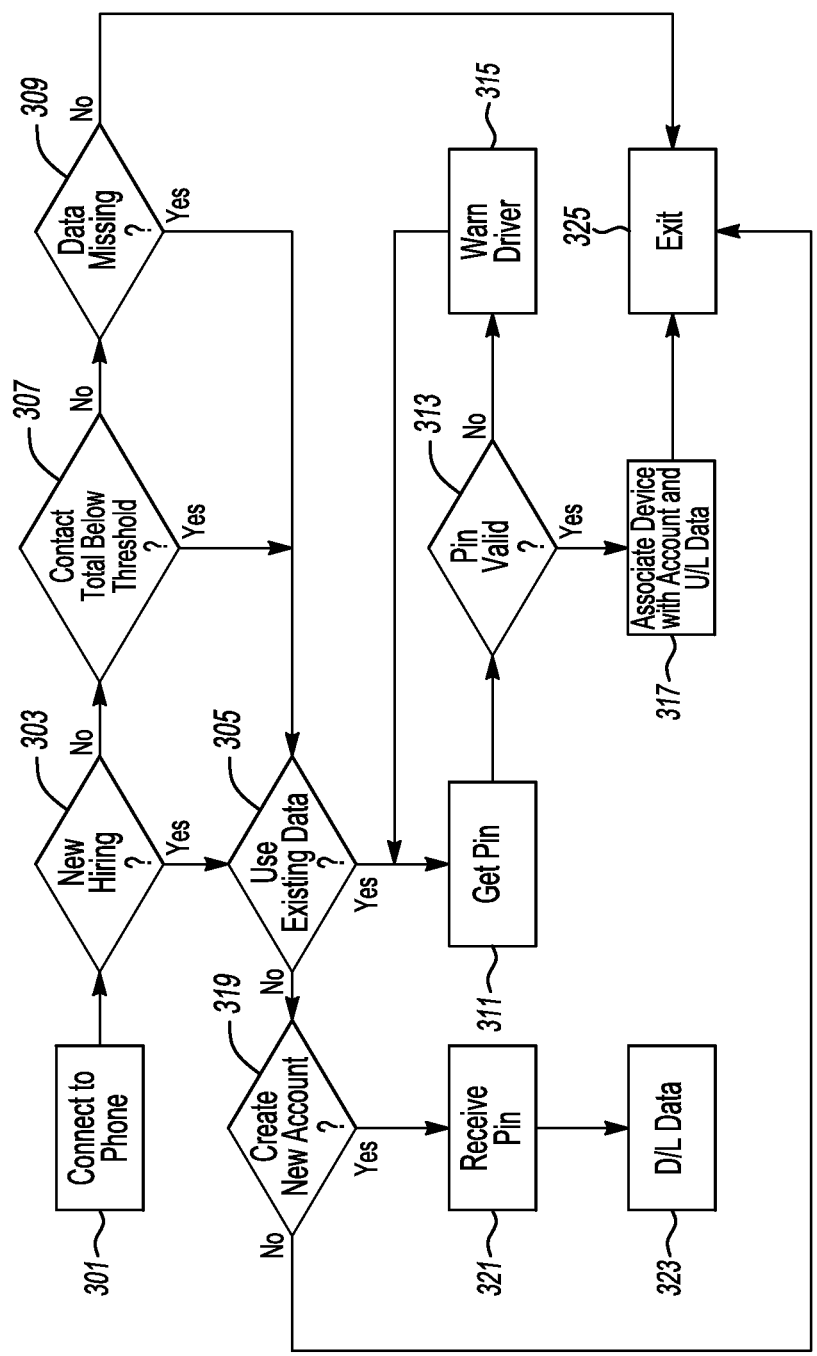
FIG. 3 shows an illustrative example of a process for data restoration.

FIG. 3 shows an illustrative example of a process for data restoration. In this illustrative embodiment, the vehicle computing system connects to a mobile device 301 (phone, PDA, etc., although in this example the device is represented by a cellular phone). Initially, the system checks to see if the connection to the device was the result of a new pairing with the device 303 (e.g., the device has presumably not been paired with the system previously).

If the pairing is a new pairing, then it is likely that either a user has never used the system (e.g., a new user) or has obtained a new phone. Accordingly, when a new pairing is detected 303, the system asks the user if the user wishes to tie the phone to a previously existing account (assuming at least one account exists in the system).

If the user wishes to use an existing account, then in this illustrative embodiment, the system asks the user for a PIN 311 (password, ID, etc.) in order to prevent unauthorized access to an account. The system loops until a proper PIN is entered (or a predefined number of times), checking the validity of the PIN 313 and notifying the user if the PIN was incorrect 315.

Once a valid PIN is entered, the local account is associated with the device and the corresponding data may also be uploaded to the phone 317 (thus populating the phone book and/or email contacts, in this example, although applications and other backed-up data could also be loaded from the vehicle computing system storage). The system then exits 325. It may also be possible to prompt the user for acceptance before the local data is uploaded to the device.

Further, it may be the case that some data already exists on the wireless device. In this instance, the system may perform a cross-check as in FIG. 2 before uploading the data, so as to accurately cross-populate the data, as opposed to simply overwriting the existing data on the device with the locally stored data associated with the account.

If the user elects not to use an existing account, then the system asks the user if the user would like to create a new account 319. If the user elects to create an account, the system prompts the user to enter a PIN 321 or other protection code. The data from the wireless device (if any exists), is then downloaded and used to populate the local data associated with the account 323.

Figure 4A:
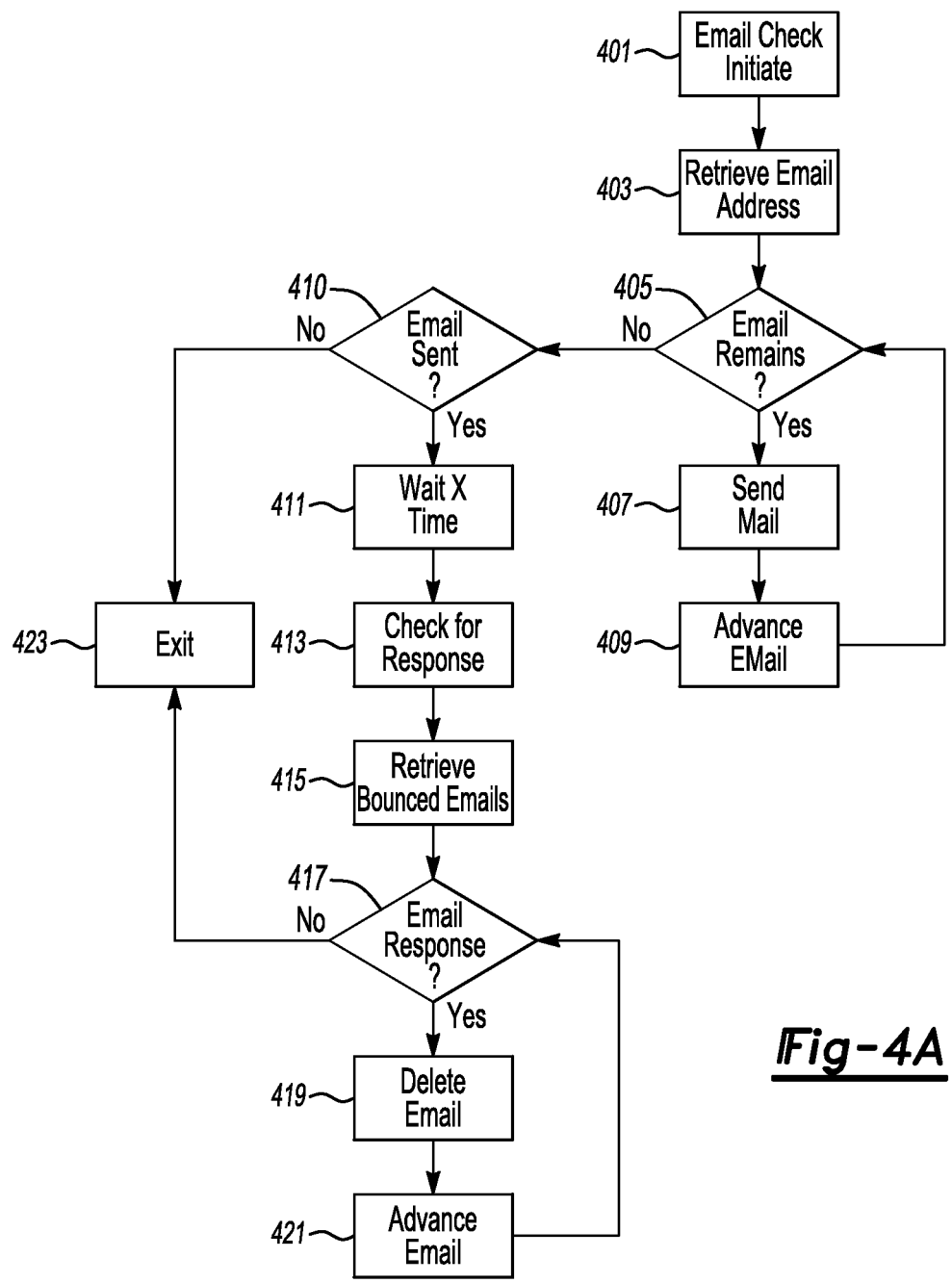
FIG. 4A shows an illustrative example of a process for email address verification.

FIG. 4A shows an illustrative example of a process for email address verification. In this illustrative embodiment, the vehicle computing system initiates (automatically or per user request) a check of email addresses (stored locally or downloaded from a wireless device) 401.

Moving to a first email address 403, the vehicle computing system first checks to see if there are any remaining addresses 405 (i.e., in this particular instance, if a first address in NULL, indicating no email addresses). If there is at least one email address, the vehicle computing system sends an email to the current email address 407.

The email sent to the address can be in several forms. The vehicle computing system could access a user's email account and send an email through that account on behalf of the user. Alternatively, the system could have an email address associated therewith for system use, and use that email. Any suitable method of "testing" an email address may be used.

The system then advances to a next email address 409, and continues to retrieve and "test" email addresses until no addresses remain for testing 405.

If at least one email has been sent 410 (if no emails have been sent, e.g. no email addresses exist, or testing is done on a periodic basis for each address, and no addresses that have not been recently tested exist, etc.) the system waits for a predetermined amount of time 411. In this embodiment, the predetermined amount of time is to allow for bounce-backs from invalid email addresses. If the system has an address associated therewith, this wait may not be implemented, but the delay helps ensure that adequate opportunity for rejection exists.

After the predetermined amount of time has passed 411, the vehicle computing system checks the associated email account (from which the emails were sent) for responses indicating invalid email addresses 413. In this illustrative embodiment, a list of "bounced" emails is accumulated 415 for parsing, although any suitable method of checking the emails may be implemented in accordance with the spirit of the invention.

If emails remain on the "bounced" list 417, the system deletes the email address from local (or remote) storage corresponding to the email address that was bounced 419. It may also be desirable to set a marker with respect to the deleted email, so that future cross-referencing with a wireless device does not result in re-population of the invalid email (assuming the device is not immediately updated). The system then advances to a next email on the bounced list, and continues to parse and delete email addresses until no bounced emails remain, at which point the system exits 423.

Figure 4B:
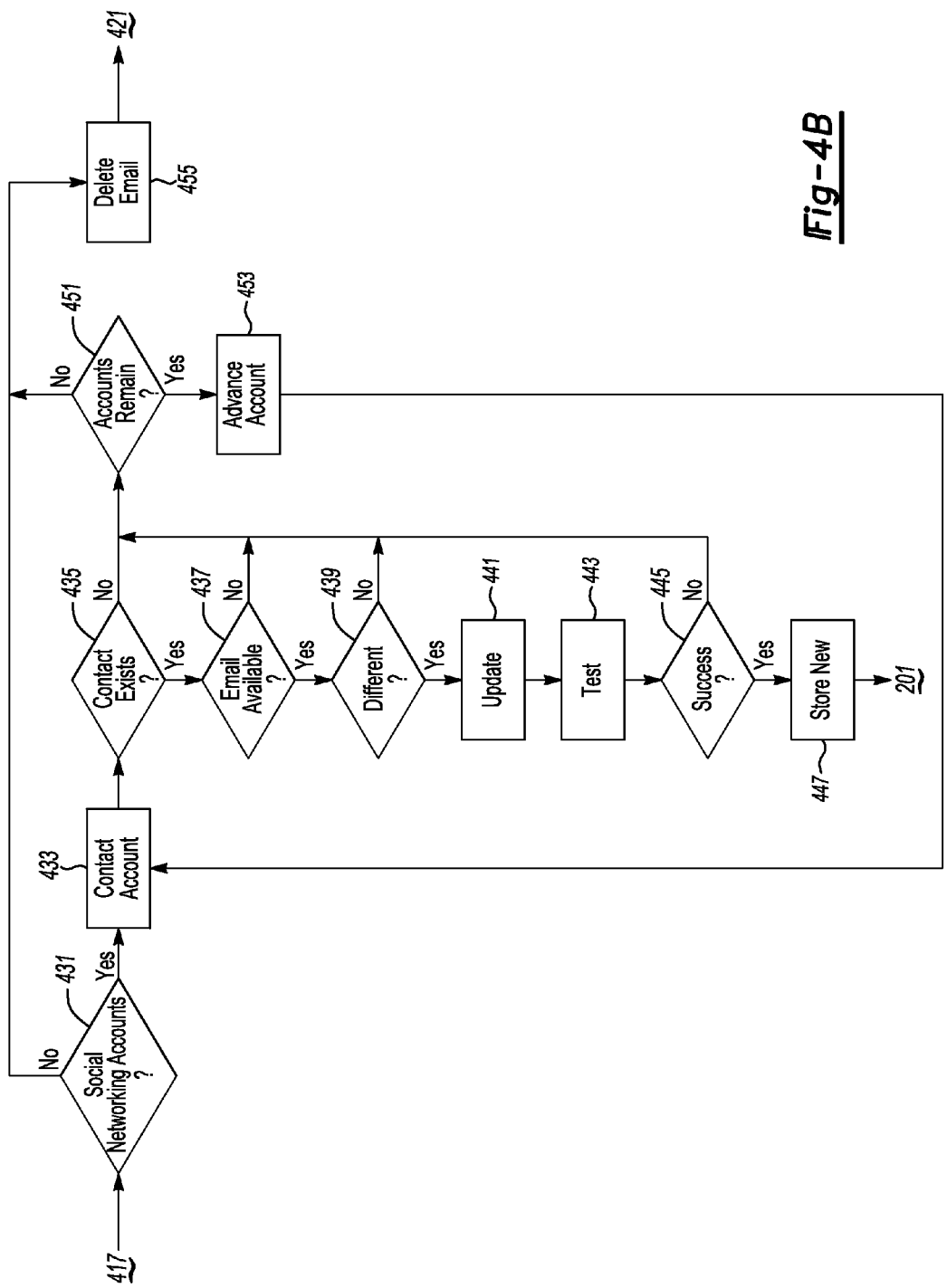
FIG. 4B shows an illustrative example of a process for invalid email address automatic correction.

FIG. 4B shows an illustrative example of a process for invalid email address automatic correction. In this illustrative embodiment, instead of simply deleting an email address, as denoted in step 419 of FIG. 4A, the vehicle computing system will attempt to determine a valid email address to replace the invalid one before deleting the invalid email address.

Once an email address has been determined to be invalid, the system checks to see if any social networking accounts are associated with the local user account storing the invalid email address (or the remote device storing the invalid email address) 431. If no social networking accounts exist, then in this example, the address is deleted 421. Additionally or alternatively, before deleting the email address, the vehicle computing system could send a reminder email to a valid user email address, notifying that user that a particular email address was deleted (in case the user can manually re-program a valid email address).

If one or more social networking accounts (e.g., without limitation, FACEBOOK, LINKEDIN, MYSPACE, etc.) exist that are associated with the user account and are accessible by the vehicle computing system (presumably, although not necessarily, through the use of a stored ID and password), the vehicle computing system contacts a first social networking account 433. The system then checks to see if a contact corresponding to the contact for whom the email address is to be deleted exists within the user's social network 435. This may require a correspondence between the stored user name and the chosen social networking name.

If no contact exists, the system checks to see if any unprocessed social networks remain 451. If so, then the system selects a new account 453 and repeats the checking process, otherwise the system assumes that a replacement email address is not available in this manner and deletes the email address 421.

If the contact does exist on a social network, the system then parses the account page of the contact to see if an email address is retrievable from that page 437. If no email address is available, the system moves on to a next account (if any).

If an email address is available, however, the system checks to see if the email address listed on the social networking site corresponds to the email address that is about to be deleted 439. If the email addresses are the same, then the system does not attempt to repopulate the email contact information stored with the user account with the known invalid email.

If a different email address is available over the social networking site, however, the system updates a local storage with that email address (since it knows the one it is overwriting is invalid) 441 and tests the new email address for validity 443 (possibly in the manner described with respect to FIG. 4A).

If the test is successful (e.g., in this example, no bounce-back) 445, the system stores the new email address as a valid email address (possibly updating the wireless device as well) and moves to a next email address 421. If the test is not successful, the system may delete the new email address and check for additional social networking accounts from which a valid email address may be obtained 451.

Figure 5:
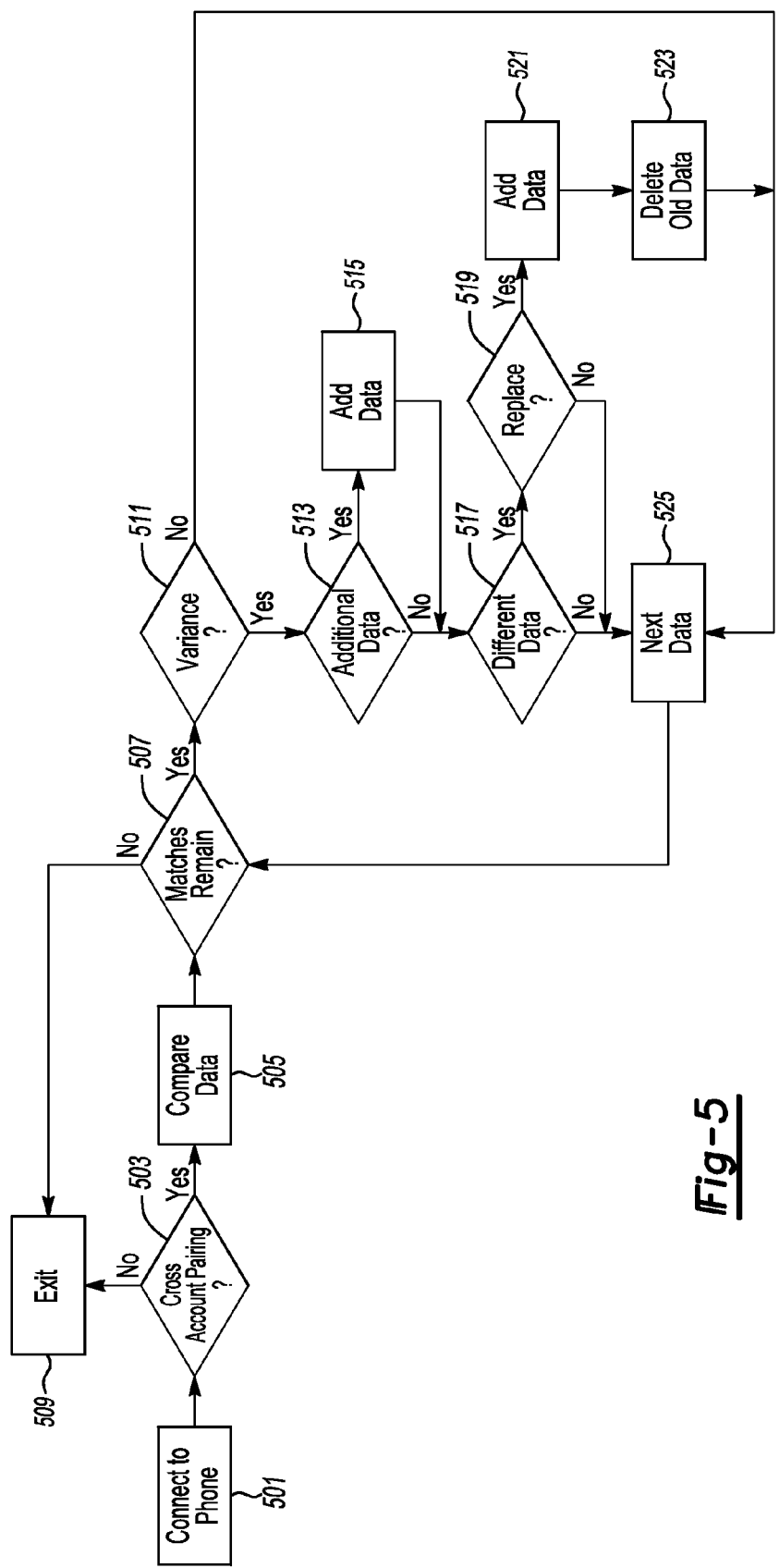
FIG. 5 shows an illustrative example of a process for cross account data maintenance.

FIG. 5 shows an illustrative example of a process for cross account data maintenance. In this illustrative example, two accounts have agreed to share common data. For example, if a husband and wife have common numbers, and one of them updates a number, they may not remember to tell the other party that the number was updated. This illustrative embodiment would facilitate the automatic update of the number to the other party's device.

In this illustrative embodiment, the vehicle computing system connects to a wireless device 501. Once the connection is established, the system checks to see if cross-account pairing is enabled for the connected device 503. If pairing is not enabled, the system exits 509.

If cross-account pairing is enabled, the system may compare data downloaded from the wireless device with the account (or accounts) to which the user is cross-paired 505. In this illustrative example, only data that matches (e.g., where the contact data is the same for both accounts) is evaluated for updates (e.g., all user data may be checked, but updates are only performed on common contacts). It may also be possible, however, to compare all data for updates, and cross populate the accounts with any missing data (if the users wish to completely share all data).

In this example, the system accumulates all the matches between accounts during the comparison 505, although the system could also perform the update process as the common contacts are established.

If one or more matches remain 507, the system checks to see if there is a variance between data stored in the cross-paired account(s) and the current match 511. If there is no variance, the system moves on to a next match 525. If there is a discrepancy in the data 511, the system checks to see if any additional data 513 exists with respect to the contact in one account that is not present in the other account. For example, one account may have a first phone number associated with the contact, and a second account may have a first and second phone number associated with the same contact. The additional data from the contact having the additional data is added to the contact lacking the data 515.

If no additional data exists, or after additional data has been added, the system checks to see if different data exists. Note that, while the illustrative embodiment defines additional data as an instance where similar and additional data exists for a contact format (phone, email, etc), it is possible to have additional and different data. For example, a first account could have one phone number and one email address associated therewith, and a second account could have two phone numbers (one similar to the first contact's) and a different email address associated therewith. Thus, after the additional phone number had been cross-populated, the variance between email addresses may still need to be evaluated.

If different data exists 517, the system then determines whether or not the data in one of the accounts should be replaced 519. This could be done through a user query as to the correct data, by using an update date/time associated with each data element (since it may be likely that the more recently updated data is the accurate data, although not necessarily), or through any other suitable method.

If it is determined that the data in one of the accounts should be replaced, then the system adds the correct data to the account with the invalid or old data 521 and deletes the old data 523. As this process occurs, it is possible that data from the presently connected device may be used to update the stored account of a non-connected but cross-linked user. Thus, when that user connects at a later date, the stored account data associated with that user may already be in an updated condition with respect to the cross-linked user's account.

A next data element is then examined 525. Once all the data has been examined, and no matches remain, the system exits 509.

Figure 6A:
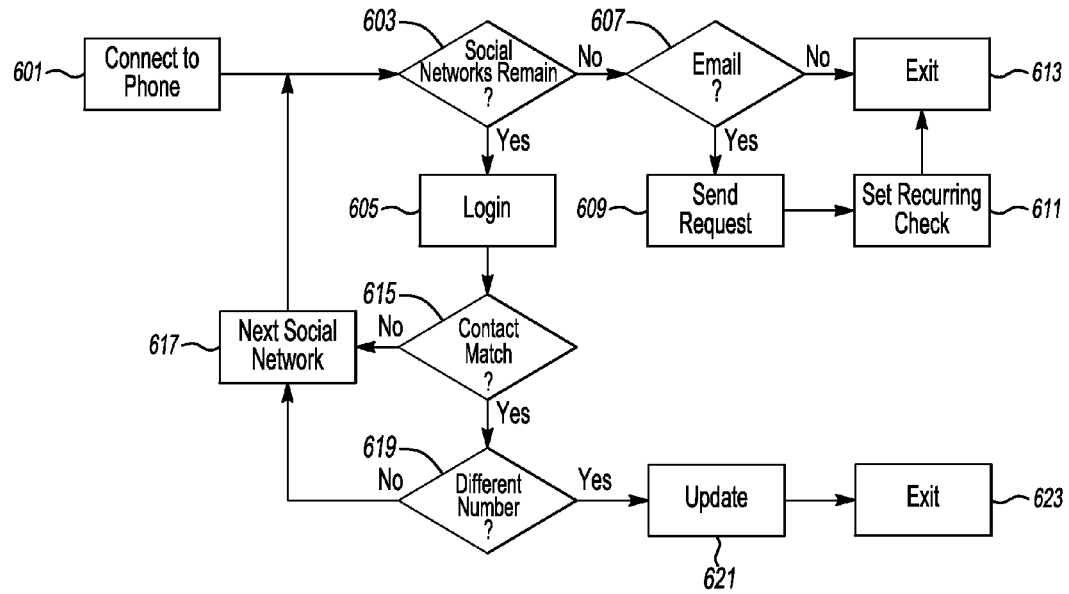
FIGS. 6A and 6B show illustrative examples of processes for invalid phone number automatic correction.
Figure 6B:
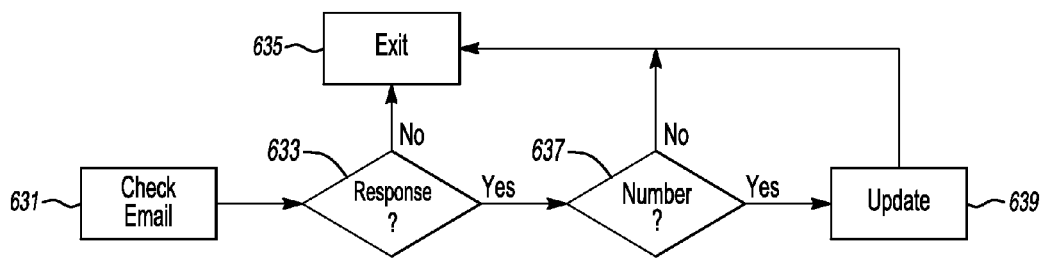

FIGS. 6A and 6B show illustrative examples of processes for invalid phone number automatic correction.

In the illustrative process shown in FIG. 6A, a contact is identified as an invalid contact 601 (or rather, the phone number associated with the contact is invalid).

This may be the result of a determination by the vehicle computing system (such as a rejected phone call) or it may be identified by the user as invalid.

If there are one or more social networks associated with the user account in which the invalid contact is stored 603, the vehicle computing system logs in to at least a first of the social networks 605. The system then searches contacts on the user's social network site, looking for a name match to the contact corresponding to the invalid phone number 615.

If a match is found, the system checks to see if a phone number is saved with respect to that contact on the social networking site 619. If a different number exists on the site, that number is assumed to be the correct number and is saved locally 621. The process then exits 623.

If no contact exists, or if there is no number or the same number, the system will check to see if access to any additional social networking sites is available.

If no social networking sites are available, or once all site options have been exhausted, the system checks to see if an email address is associated with the contact 607. This email address may have also been obtained while the system was searching one or more social networking sites.

The vehicle computing system sends a request email to the email address 609, requesting an updated phone number. This email may be sent from an account associated with the vehicle, a user account, etc.

The vehicle computing system then periodically checks the email account from which the email was sent for a response 611 (this may be a separately running process, since the response will likely take some time to obtain).

The process then exits 613

FIG. 6B shows an illustrative example of a process for checking for a response email. The process checks the email account 631 to see if a response has been received 633. If the response has been received, the system checks the response to see if a valid response number has been included with the response 637. If there is a valid response to the email, and if the response contains a valid number, then the vehicle computing system uses the number to update the contact 639. This update can be done to locally saved data, data saved on the wireless device, or both.

Although the invention has been described in terms of illustrative embodiments, these examples are provided for illustrative purposes only, and are not intended to limit the scope of the invention in any manner.

What is claimed:

1. A computer-implemented method comprising:
    downloading a plurality of data elements from a wireless device to a connected vehicle computing system (VCS);
    determining, via the VCS, whether a user account, corresponding to the wireless device, exists in storage;
    determining, via the VCS, whether the user account currently has, associated therewith, stored data elements of the same type as the downloaded data elements;
    contingent on whether the user account has stored data elements associated therewith, comparing, via the VCS, the downloaded data elements to the stored data elements;
    storing any downloaded data elements not currently existing in the stored data elements associated with the user account and not in conflict with the stored data elements associated with the user account;
    resolving conflicts, via the VCS, between downloaded data elements and stored data elements, to establish which of the conflicting elements is representative of a proper element version, including determining which version of conflicting elements is a more recently entered version and designating the more recently entered version as the proper element version; and
    storing a proper element resulting from each conflict resolution corresponding to the proper element version.

2. The method of claim 1, wherein the plurality of data elements includes phone contact names and numbers.

3. The method of claim 1, wherein the plurality of data elements includes email contact names and email addresses.

4. The method of claim 1, wherein the storage is local storage in a vehicle in which the VCS is included.

5. The method of claim 1, wherein the storage is remote storage on a remote network with which the VCS is operable to communicate.

6. The method of claim 1, wherein the resolving conflicts further comprises asking a user which version of conflicting elements is the proper element version.

* * * * *